US012804255B2

(12) United States Patent
Haine et al.

(10) Patent No.: US 12,804,255 B2
(45) Date of Patent: Nov. 17, 2026

(54) INTEGRATED CIRCUIT FOR OPTIMIZING AUTOMATED ZOOM IN MOTION AREA OF IMAGE

(71) Applicant: E-PEAS, Louvain-la-neuve (BE)

(72) Inventors: Thomas Haine, Louvain-la-neuve (BE); Loic Henneton, Louvain-la-neuve (BE); Geoffroy Gosset, Louvain-la-neuve (BE)

(73) Assignee: E-PEAS, Louvain-la-Neuve (BE)

( * ) Notice: Subject to any disclaimer, the term of this patent is extended or adjusted under 35 U.S.C. 154(b) by 0 days.

(21) Appl. No.: 19/146,001

(22) PCT Filed: Jan. 9, 2024

(86) PCT No.: PCT/EP2024/050351
§ 371 (c)(1),
(2) Date: Jul. 7, 2025

(87) PCT Pub. No.: WO2024/149733
PCT Pub. Date: Jul. 18, 2024

(65) Prior Publication Data

US 2026/0222680 A1 Jul. 30, 2026

(30) Foreign Application Priority Data

Jan. 10, 2023 (EP) .................................... 23150997

(51) Int. Cl.
*H04N 23/65* (2023.01)
*H04N 23/667* (2023.01)
*H04N 25/443* (2023.01)

(52) U.S. Cl.
CPC ......... *H04N 23/651* (2023.01); *H04N 23/667* (2023.01); *H04N 25/443* (2023.01)

(58) Field of Classification Search
CPC ... H04N 23/651; H04N 23/667; H04N 25/443
See application file for complete search history.

(56) References Cited

U.S. PATENT DOCUMENTS 6,541,751 B1 4/2003 Bidermann
8,000,393 B2 * 8/2011 Tanaka ................ H04N 19/139 375/240.16

(Continued)

FOREIGN PATENT DOCUMENTS

KR 20040024888 A 3/2004

OTHER PUBLICATIONS

Vision sensor chip and operation method Therefor, and electronic device by Dong et al. (WO22047651A1) (Year: 2022).*
Int'l Search Report for PCT/EP2024/050351, dated Feb. 28, 2024.

*Primary Examiner* — Yogesh K Aggarwal
(74) *Attorney, Agent, or Firm* — MaxGoLaw PLLC

(57) ABSTRACT

An integrated circuit of an image capture device for automatically optimizing a ratio (A1/A0) of an output image area (A1) to a main window area (A0) is provided. The integrated circuit includes an array of photosensors for capturing an input image (P0), and a processing unit configured for carrying out the following actions,

- in an image detection mode, a sequence of successive reference images (Prefj) are captured at different times with a subarray of Nr reference photosensors, and a number (Nm) of motion pixels (pm) are determined, and switching to
- in an image capture mode, wherein the parameters of an output image to be captured are defined as follows:
  - an output window (W1) of an output window area (A1) which encloses at least a predefined number (Nmt) of motion pixels (pm), and
  - an output pixel density D1=N1/A1≤D0, with N1≤N1*m* capture the output image (P1).
- transferring the output image (P1) comprising N1 pixels out of the integrated circuit.

20 Claims, 4 Drawing Sheets

(56) References Cited

U.S. PATENT DOCUMENTS

| | | | |
|---|---|---|---|
| 10,200,572 | B1 * | 2/2019 | Fotland .................. G06T 7/246 |
| 2006/0262958 | A1 | 11/2006 | Yin et al. |
| 2008/0007821 | A1 | 1/2008 | Kishida |
| 2009/0109290 | A1 | 4/2009 | Ye et al. |
| 2009/0219387 | A1 | 9/2009 | Marman et al. |
| 2013/0162759 | A1 | 6/2013 | Alakarhu et al. |
| 2013/0187027 | A1 | 7/2013 | Qiao et al. |
| 2015/0326784 | A1 | 11/2015 | Hayashi |
| 2021/0185266 | A1 | 6/2021 | Chan et al. |

* cited by examiner $A1 = A0$
$N1 \leq N1m < N0$
$\Rightarrow D1 = N1 / A0 < D0$

INTEGRATED CIRCUIT FOR OPTIMIZING AUTOMATED ZOOM IN MOTION AREA OF IMAGE

TECHNICAL FIELD

The present invention concerns an integrated circuit (=IC) of an image capture and treatment device configured for capturing images when a movement is detected. Once a movement is detected within a frame of the images, the integrated circuit of the present invention automatically optimizes a ratio of the resolution of the captured images to their size in terms of both dimensions of the frame and number of pixels prior to transferring the captured images to a processor for further image treatment. Such optimization carried out within the integrated circuit prior to transferring the output images out of the IC reduces considerably the processing resources and power consumption of the image capture and treatment device. Monitoring cameras equipped with the IC of the present invention require less powerful processing equipment and have longer autonomy.

BACKGROUND OF THE INVENTION

Image capture devices for monitoring movements in a region visible within a main window having a main image area (A0) are known in the art. Processing a large number of full-scale images, however, requires substantial processing power and energy consumption, thus increasing the cost of the devices and of their use. Energy consumption management can be important, for example when the image capture device monitors an area isolated from any external power source and is powered, for example by batteries, possibly linked to photovoltaic panels. Among the most power and resource consuming operations is the transfer of images from the IC comprising the array of photosensors capturing the image to a processor for further treatment of the captured images. The power consumption and processing resources are proportional to both the number of images being transferred and their sizes (i.e., their numbers of pixels). Reducing power consumption could therefore be achieved by transferring less images of smaller sizes.

US20220141409 describes a method and device for detecting a region among the regions of the imaging plane in which a subject image has changed between two images. The number of acquired pixel signals for detecting a movement is less than the number of pixels included in the partial region. In response to the detection of a movement in the region, the device passes into a normal image capturing mode to capture one or more images. The thus acquired full-sized image can be transferred to a processor to be compressed and resized after capture. This method reduces the number of images being transferred, since images are transferred only upon detection of a movement between successive images comprising less pixels than the full-sized images. It does not, however, reduce the size of the images being transferred.

U.S. Pat. No. 7,279,671 describes an image acquisition apparatus for use with a microscope comprising: an image pickup element that acquires images, a change detector that detects the amount of change between an image acquired by the image pickup element and a subsequent image acquired by the image pickup element. The apparatus comprises a binning means that performs binning processing by calculating and outputting cumulative pixel information of multiple proximate pixels of an input image as an output pixel so as to form a reduced-data output image, or that outputs pixel information of an input image as output data without reduced-data processing, based on the amount of change detected by the change detector.

U.S. Ser. No. 11/025,822 describes a method for detecting a predefined event by detecting a presence or an absence of movement of an object in a past frame to a current frame as the presence or the absence of the predetermined event. It performs pixel addition for each divided block to detect a change in a subject image in divided block units.

US2014/0118592 describes an imaging sensor and a method for detecting motion, comprising operating the sensor in a motion-detecting mode at a first power level for detecting motion from received images detected by pixels in the pixel array, and switching the imaging sensor from the motion-detecting mode to a feature extraction mode in response to detecting motion; and operating the imaging sensor in the extraction mode at a second power level that is higher than the first power level. The motion-detecting mode operates based on pixel data received from a plurality of rows or columns of pixel data from the pixel array.

CN106657780A describes an image previewing method and device applied to user equipment. The image previewing method comprises the steps of, in response to a preview instruction sent by a user, generating an image preview image in an initial pixel mode, wherein the initial pixel mode is a pixel combination mode; receiving a zooming instruction sent by the user; and outputting a zoomed preview image in a zoomed pixel mode based on the received zooming instruction, wherein the merging rate of the pixel in the zoomed pixel mode is smaller than the merging rate of the pixel in the initial pixel mode. Therefore, compared with the existing zoomed preview image, the image previewing method improves the definition of the zoomed preview image. The output pixel density (D1) is always increased from the initial preview. The initial preview image is acquired in an initial pixel mode, where the initial pixel mode is a pixel binning mode and, upon receiving a zoom instruction sent by the user; the zoomed image is acquired in a zoom pixel mode wherein the binning ratio of pixels in the zoomed pixel pattern is smaller than the binning ratio of pixels in the initial pixel pattern.

U.S. Ser. No. 11/218,641 describes an image capturing device comprising a processor configured for causing an image sensor to transition between image capture modes specifying different binning levels in the case that a digital zoom level satisfies a predefined threshold There remains a need for reducing the power consumption of image capture and treatment devices configured for capturing images when a movement is detected, whilst maintaining a high resolution of captured images of interest prior to transferring them for further treatments after capture thereof.

SUMMARY OF THE INVENTION

The present invention is defined in the appended independent claims. Preferred embodiments are defined in the dependent claims. In particular, the present invention concerns an integrated circuit for automatically optimizing a ratio (A1/A0) of an output image area (A1) to a main window area (A0) and optimizing, preferably maximizing a product D1×A1 of an output pixel density (D1) multiplied by the output image area (A1) of a motion detection area defining an output image (P1) composed of a predefined maximum number of pixels (N1*m*). The integrated circuit comprises an image sensor and a processing unit.

The image sensor comprises an array formed by a nominal number (N0) of photosensors configured for capturing values of N0 pixels defining corresponding input images (P0) each input image being comprised in a main window (W0) having the main window area (A0). The input images has a nominal pixel density D0=N0/A0.

The processing unit is configured for carrying out the following actions in a movement detection mode:

- controlling a predefined subarray of Nr reference photosensors, with Nr≤N0, to capture a sequence of successive reference images (Prefj) at different times, each reference image being defined by Nr corresponding reference pixels (pr),
- as a given reference image is captured, determining a value difference between corresponding pixels from the given reference image and a reference image preceding the given reference image in the sequence and selecting a number (Nm) of motion pixels (pm) whose value differences exceed a predefined threshold variation.

The gist of the present invention is that the processing unit is configured, on the one hand, for saving the predefined maximum output number N1*m*<N0 of pixels not to be exceeded by an output number (N1) of pixels defining the output image (P1) to be transferred out of the integrated circuit (i.e., N1≤N1*m*<N0) and, on the other hand, for passing in an image capture mode when the number Nm of motion pixels (pm) satisfies a triggering condition. When the triggering condition is fulfilled, the processing unit is configured for,

- defining:
  - an output window (W1) of an output window area (A1) wherein A1=n×A0 and 0<n<1, which encloses at least a predefined lower triggering number (Ntu) of motion pixels (pm), and
  - an output pixel density D1=N1/A1≤D0, wherein an output number of pixels N1=m×N0≤N1*m* and 0<m≤n<1,
- controlling the array of N0 photosensors to capture the output image (P1) defined by the output window (W1) having the output window area (A1) and output pixel density (D1),
- transferring the output image (P1) comprising N1 pixels out of the integrated circuit.

In one embodiment, the main window (W0) has a length (L0) and a height (H0) and A0=L0×H0, and the output window (W1) has a length (L1) and a height (H1) and A1=L1×H1, such that L1=nL×L0 and H1=nH×H0, wherein nL and nH are each smaller than or equal to unity (i.e., nL≤1, nH≤1), and are preferably each independently equal to 1, ½, ⅓, or ¼, and wherein an aspect ratio (L1/H1) of the output window (W1) is preferably equal to a nominal aspect ratio (L0/H0), (i.e., L1/H1=L0/H0 and $n=nL^2=nH^2$)

Alternatively or concomitantly, the predefined lower triggering number (Ntu) of motion pixels (pm) is comprised between 50% and 100%, preferably between 75% and 95%, or is preferably equal to 100% of the number Nr of reference pixels (pr).

Alternatively or concomitantly, the output window (W1) is rectangular, and the predefined number of motion pixels (pm) is inscribed in the output window (W1).

Alternatively or concomitantly, the length (L1) and height (H1) of the output window (W1) are selected among a predefined set of output image window lengths and heights.

Alternatively or concomitantly, the output window area (A1) is greater than or equal to a predefined minimum output window area (A1 min), such that 0<A1 min≤A1≤A0.

Alternatively or concomitantly, the output pixel density (D1) is greater than or equal to a predefined minimum output pixel density (D1 min), such that 0<D1 min D1≤D0.

The processing unit defining the output window (W1) and the output pixel density (D1) of the output image (P1) defined by the output number (N1<N1*m*) of pixels can be configured for a given output pixel density (D1=m D0), to maximize the outputwindow area (A1=n1 A0), such that the output number (N1=(m×n1) N0) of pixels tends towards, preferably is equal to the maximum output number (N1*m*) of pixels (i.e., N1=(m×n1) N0×N1*m*). The processing unit can also be configured for a given output window area (A1=n A0), to maximize the output pixel density (D1=mt D0), such that the output number (N1=(mt×n) N0) of pixels tends towards, preferably is equal to the maximum output number (N1*m*) of pixels (i.e., N1=(mt×n) N0×N1*m*).

It is preferred that the processing unit is configured for allowing a modification of the number (Nr) and positions of the reference photosensors. When the number Nm of motion pixels (pm) satisfies the triggering condition, the processing unit is preferably configured for generating an interrupt signal indicative of a coming output image (P1) and of a passage from the movement detection mode to the image capture mode.

BRIEF DESCRIPTION OF THE FIGURES

For a fuller understanding of the nature of the present invention, reference is made to the following detailed description taken in conjunction with the accompanying drawings in which.

FIG. 2(*b*): shows one way of defining an output window (W1) of output image area (A1=H1×L1) inscribing the motion pixels of FIG. 2(*a*), wherein H1=nH×H0 and L1=nL×L0, with nL independent of hL.

FIG. 2(*c*): shows an alternative way of defining an output window (W1) of output image area (A1=H1×L1), including the motion pixels of FIG. 2(*a*), wherein H1=nH×H0 and L1=nL×L0, with nL=hL.

FIG. 3(*b*): shows the output window (W1) of same output image area (A1) as the main window area (A0) (i.e., A1=A0) and with four times less pixels by a 2×2 binning operation (i.e., N1=% N0).

FIG. 5(*b*): shows one way of defining an output window (W1) of output image area (A1=H1×1) comprising all the blocks (Bi) containing at least one motion pixel (pm).

FIG. 5(*c*): shows an alternative way of defining an output window (W1) of output image area (A1=H1×L1), comprising only the blocks in which all reference pixels (pr) are motion pixels (pm).

DETAILED DESCRIPTION OF THE INVENTION

The present invention concerns an integrated circuit for automatically optimizing a ratio (A1/A0) of an output image area (A1) to a main window area (A0) and optimizing, preferably maximizing a product D1×A1 of an output pixel density (D1) multiplied by the output image area (A1) of a motion detection area defining an output image (P1) composed of a predefined maximum number of pixels (N1*m*). The ratio A1/A0 defines the dimensions of the output window compared with the dimensions of the main window (W0). As the output window cannot be larger than the main window, A1/A0<1. Maximizing the product D1×A1 yields the maximum resolution allowed for a maximum output area (A1) of the output image (P1) satisfying the condition N1<N1*m*. Once a movement is detected in a motion detection area, the integrated circuit of the present invention automatically defines the parameters to acquire the output image (P1) by optimizing these two ratios respecting a condition that the output image must not exceed the predefined maximum number of pixels (N1*m*). The thus optimized output image (P1) is acquired and can be transferred for further treatments. This way, only images not exceeding N1*m* pixels are transferred, thus allowing saving energy and resources compared with transferring full-size images as for example described in US20220141409.

The integrated circuit of the present invention comprises an image sensor and a processing unit. The image sensor comprises an array formed by a nominal number (N0) of photosensors configured for capturing values of N0 pixels defining corresponding input images (P0). Each input image (P0) is comprised in a main window (W0) having the main window area (A0), and a nominal pixel density D0=N0/A0, defined as the number of pixels per unit area and characterizes the resolution of the input image (P0).

The processing unit is configured for identifying a region of the main window (W0) where a movement was detected between two points in time. To detect the region and the movement, the processing unit carries out the following actions. In a first step the processing unit controls a predefined subarray of Nr reference photosensors, with Nr≤N0, preferably Nr<N0, to capture a sequence of successive reference images (Prefj) at different times. Each reference image (Prefj) is defined by Nr corresponding reference pixels (pr).

Figure 1A:
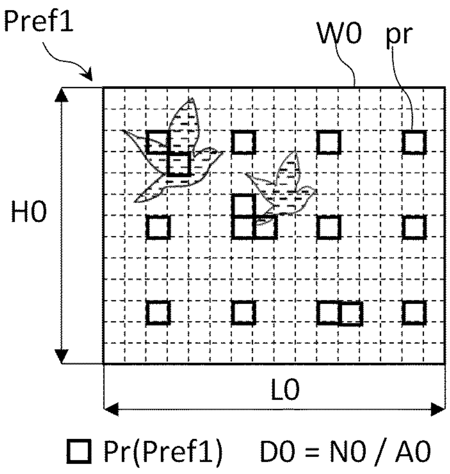
FIGS. 1(*a*) & 1(*b*): show arrays of pixels of first reference image (Pref1) and second reference image (Pref2) comprising two birds in motion, with a number Nr of same reference pixels indicated by white and shaded squares, respectively.
Figure 1B:
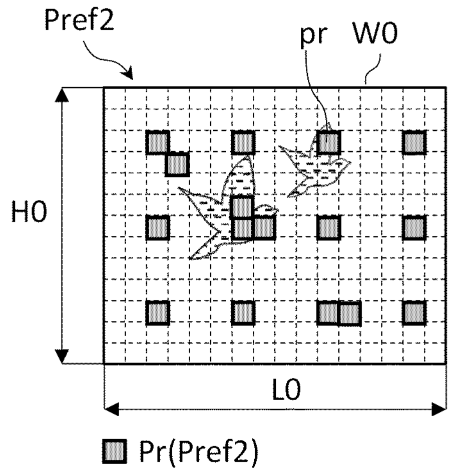
Figure 2A:
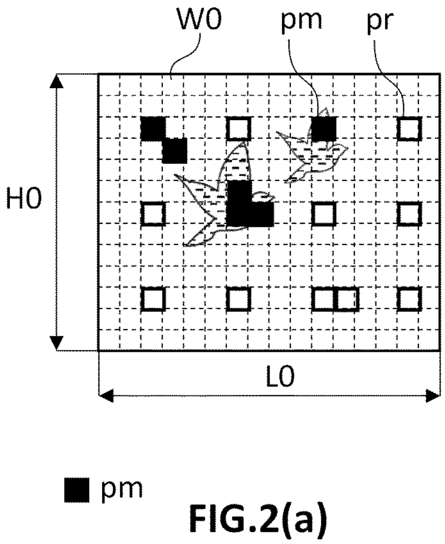
FIG. 2(*a*): shows a first example of the motion pixels (Pm) in black squares, whose value differences between the first and second reference pixels of FIGS. 1(*a*) & 1(*b*) exceed a predefined threshold variation.
Figure 2B:
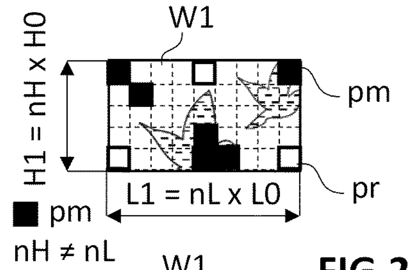
Figure 2C:
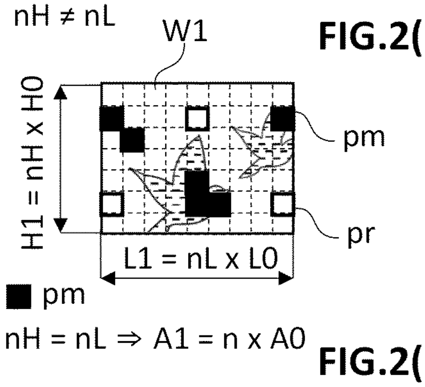

Referring to FIG. 1(*b*), as a given reference image (Pref2) showing two birds flying is captured, a value difference is determined between corresponding reference pixels (pr) from the given reference image (Pref2) and a reference image (Pref1) (cf. FIG. 1(*a*)) preceding the given reference image (Pref2) in the sequence. As shown in FIG. 2(*a*), a number (Nm) of motion pixels (pm) are selected (cf. black squares) whose value differences exceed a predefined threshold variation, indicative that the birds have moved within an area comprising the motion pixels.

The reference image (Pref1) the given reference image (Pref2) is compared with can be a first image in a sequence of all images preceding the given image for which the triggering condition was not satisfied. For example, two successive reference images (Pref1, Pref2) are captured, and the values of their reference pixels (pr) are compared with one another. If no motion pixels (pm) or not enough motion pixels (pm) are identified to satisfy the triggering conditions, a third reference image (Pref3) and the values of its reference pixels (pr) are compared with the first reference image (Pref1), and so on until a movement is detected when the triggering conditions are satisfied. When the triggering conditions are fulfilled, the processing unit switches from the movement detection mode to the image capturing mode described in continuation.

In the image capturing mode, the processing unit is configured for first optimizing the properties of an output image (P1) to be captured, before capturing the output image (P1). The processing unit is configured for carrying out the following actions.

The processing unit saves the predefined maximum output number N1*m* of pixels not to be exceeded by an output number (N1) of pixels defining the output image (P1) to be transferred out of the integrated circuit. The predefined maximum number (N1*m*) of pixels is smaller than the nominal number (N0) (i.e., N1≤N1*m*<N0,<). It is preferred that the processing unit be configured for allowing a modification of the maximum output number (N1*m*) of pixels by a user, as this parameter will affect the power consumption and resources required for operating the image capturing device.

To optimize the parameters of the output image (P1) before acquiring it, the processor then defines an output window (W1) of an output window area (A1) smaller than or equal to the main window area (A0), i.e., A1=n×A0 and 0<n<1, which encloses at least a predefined number (Nmt) of motion pixels (pm). The output window (W1) defines the size and region of the output image (P1) to be captured. Based on the output window area (A1) so defined, the processor also defines an output number (N1) of pixels forming the output image (P1), wherein N1=m×N0<N1*m* with 0<m≤n<1.

The ratio (N1/A1) of the thus defined output number (N1) of pixels to the output window area (A1) defines the output pixel density D1=N1/A1<D0, of the output image (P1) to be captured.

The processor is configured for controlling the array of N0 photosensors to capture the output image (P1) defined by the output window (W1) having the output window area (A1) and output pixel density (D1). The thus captured output image (P1) has not more than the predefined maximum output number N1*m*, which is important to limit the weight of the output image (P1) to be transferred. At the same time, by optimizing, on the one hand, the dimensions and region within the main window (W0) of the output image (P1) and, on the other hand, maximizing the number (N1) of pixels satisfying the condition of not exceeding the predefined maximum output number (N1*m*) of pixels (i.e., N1<N1*m*), the output image to be captured has maximal resolution with the highest possible output pixel density (D1) satisfying the condition. The processing unit is configured for transferring the output image (P1) comprising N1 pixels out of the integrated circuit for further treatment.

Main Window (W0), Main Window Area (A0), Nominal Number of Pixels (N0)

The integrated circuit comprises an array of a nominal number (N0) of photosensors. Each photosensor is configured for capturing a value of a corresponding pixel. The pixels form in combination an image. If the values of all photosensors of the array are used for forming the image, the image would be formed by N0 pixels and confined within a main window (W0) of output image area (A0). The resolution of the image is characterized by the pixel density. The maximum density of a given array is the nominal pixel density, $D0=N0/A0$. The pixel density of an image captured with the given array of photosensors can be less than D0, if less than N0 pixels form the image (e.g., by binning), but it cannot be higher, because there cannot be more than N0 pixels captured by N0 photosensors, and the size of each pixel is constant.

For example, a Video Graphics Array (VGA) has a resolution of 640 pixels length by 480 pixels height yielding $N0=307{,}200$ pixels. If each pixel has a pixel area (a0), the main window area would be $A0=307{,}200 \times a0$. An output mage (P1) with less than N0 pixels can be captured with a VGA. For example, a 2×2 binning yields a quarter VGA (=QVGA) having an output number of pixels, $N1=320 \times 240$ pixels=76,800 pixels. Similarly, a 4×4 binning yields a quarter quarter VGA (=QQVGA) having an output number of pixels, $N1=160 \times 120$ pixels=19,200 pixels.

On the other hand, if the area is reduced, enclosing less than N0 pixels, the output density, $D1=N1/A1$ remains constant (without binning) as the output number of pixels (N1) enclosed within the output area (A1) decreases proportionally with the reduction of the output area (A1). Reducing the output number (N1) of pixels in a given output image area (A1) is possible by aggregation (or binning) or by decimation. The output pixel density (D1) of the output image (P1) decreases as a result of such operations.

Continuously capturing images as large as the nominal number (N0) of pixels, when no event occurs in front of the camera is a waste of energy and processing resources. For this reason, the integrated circuit comprises a processing unit configured for first acting in a motion detection mode, configured for detecting whether a movement has occurred within the field defined by the main window (W0). The movement detection mode is also configured for detecting the region within the main window (W0) where the movement occurred. The movement detection mode is discussed in more details in continuation.

Once a movement has been detected within the field defined by the main window (W0), the processing unit of the integrated circuit can switch to an image capture mode. Capturing a full-sized output image of main window area (A0) and nominal density (D0) is easy but transferring such a heavy output image (P1) out of the integrated circuit to an image processing unit consumes considerable energy and resources. For this reason, the processing unit of the integrated circuit is configured for capturing an image comprising not more than the predefined maximum output number (N1*m*) of pixels, but maximizing the resolution of the output image, by optimizing, preferably maximizing the product $D1 \times A1$, i.e., maximizing the output pixel density, $D1=N1/A1$, for the given output image area A1, and respecting the condition than $D1 \times A1=N1$ N1*m*, and/or maximizing the output image area A1 for a given output pixel density D1.

This way, the output image is sufficiently light for transfer out of the integrated circuit for further processing, as it is formed with N1 pixels only, yet with the highest possible resolution allowed by the predefined maximum output number (N1*m*) of pixels, with D1 tending towards or even equaling the density N1*m*/A1. In some embodiments, it is preferred that N1=N1*m*. This is the case, for example, as many artificial intelligence algorithms for treating an output image (P1) are configured to work on pictures of a predefined and fixed size. By capturing and sending out of the integrated circuit an output picture of fixed size, N1=N1*m*, the artificial intelligence algorithm can process the output image (P1) directly, without having to reformat it before processing it.

Movement Detection Mode

In the movement detection mode, the processing unit controls a subarray only of a number Nr of reference photosensors to capture a sequence of successive reference images (Prefj) at different times. Each reference image (Prefj) being defined by Nr corresponding reference pixels (pr). The number Nr of photosensors and reference pixels (pr) can be the same as the nominal number N0 of photosensors and pixels, but for sake of energy saving, it is preferred that $Nr<N0$ as shown in FIGS. 1(*a*) and 1(*b*), where the reference pixels (pr) are represented with white and shaded squares.

Figure 6:
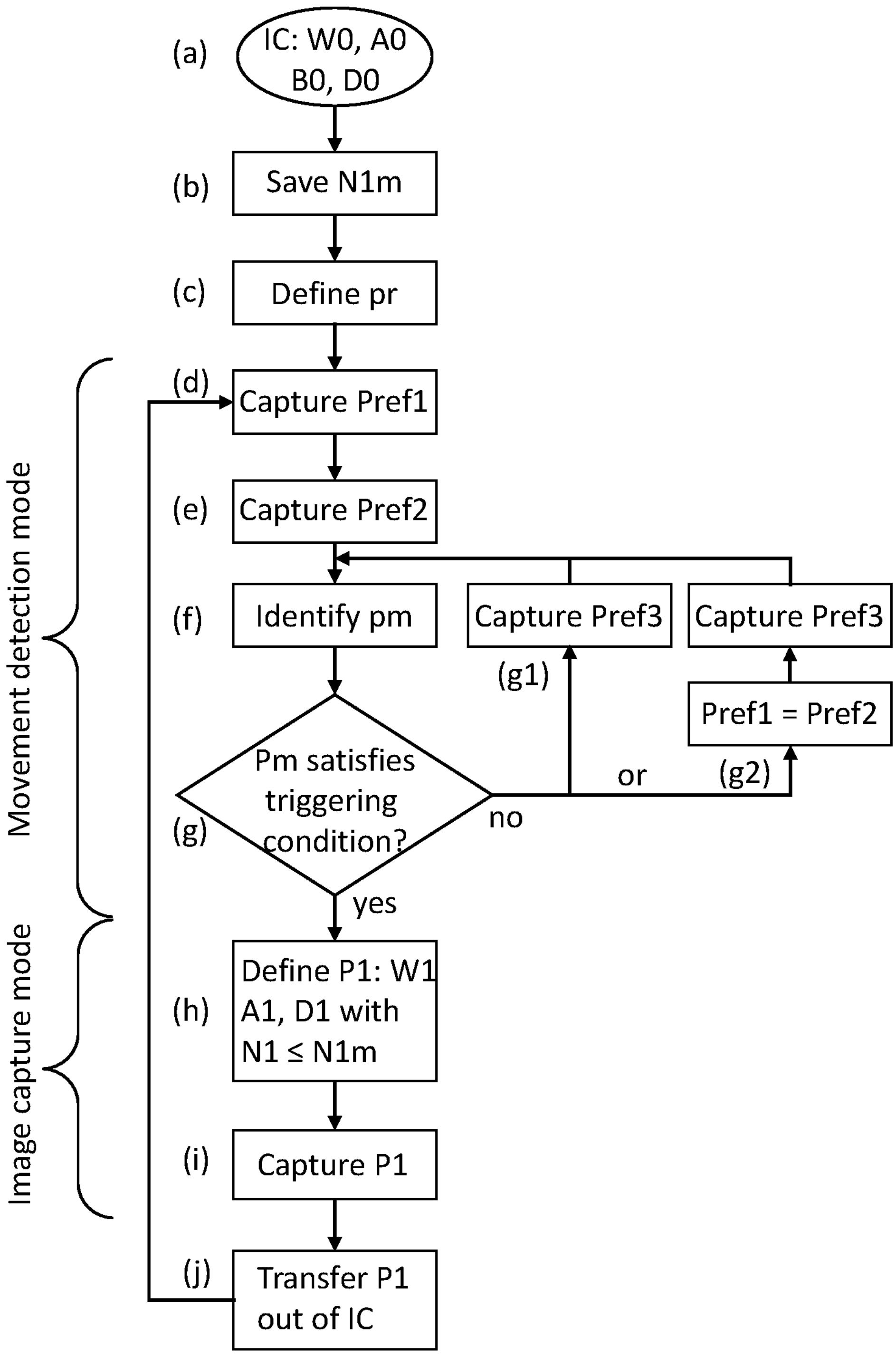
FIG. 6: shows a flowchart of how the processing unit of the integrated circuit of the present invention is configured to work.

As illustrated in FIG. 6, loop (g)-(g1)-(f), the processing unit can compare the values of the reference pixels (pr) between a given reference image (Pref1) and each successive reference image (Pref2) to detect any value difference exceeding a predefined threshold variation. Alternatively, as shown in FIG. 6, loop (g)-(g2)-(f), the processing unit can compare a successive reference image (Pref2) with a preceding reference image (Pref1) preceding the successive reference image (Pref2) in the sequence of reference images (Pref1-Pref3) until a movement is detected. The reference pixels (pr) having values differing by more than the predefined threshold variation are identified and stored as motion pixels (pm). For example, comparing the birds captured in reference images (Pref1, Pref2) in FIGS. 1(*a*) and 1(*b*), it can be seen that the values of six reference pixels have changed due to the displacement of the two birds in the time separating the capture sequence of the reference images (Pref1, Pref2) and are identified by the processing unit as motion pixels (pm). These motion pixels (pm) are represented as black squares in FIG. 2(*a*).

The reference pixels (pr) can be evenly distributed over the main window area (A0) or, alternatively, can be located at critical areas of the window (W0) where motions are expected. It is preferred that the processing unit is configured for allowing a modification of the number (Nr) and positions of the reference photosensors, depending on the specific application the image capturing device is allocated to. The value of the predefined threshold variation depends on the type of events expected to happen and can preferably also be modified by the user. For example, if the image capturing device is programmed for detecting movements of flying birds, the movements of leaves in surrounding trees should not be identified as movements, and the value variations associated with leaves moving should fall below the predefined threshold variation. The skilled person knows how to program the predefined threshold variation in order to only identify movements which are meaningful to the specific objectives of the image capturing device.

Figure 4A:
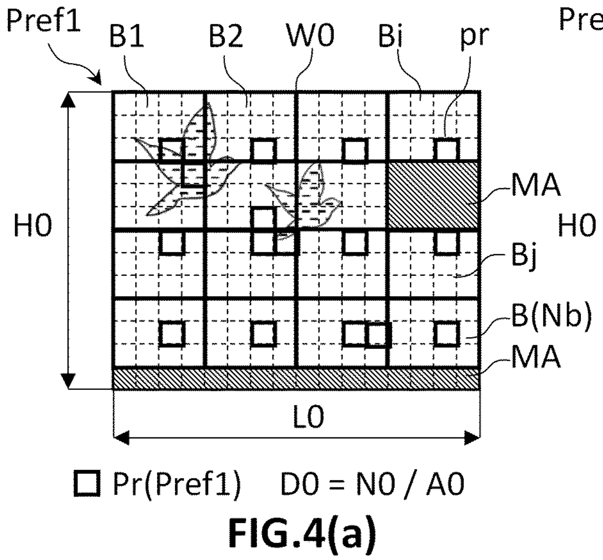
FIGS. 4(*a*) & 4(*b*): show arrays of pixels of first reference image (Pref1) and second reference image (Pref2) comprising two birds, with the same number Nr of same reference pixels as showed in FIGS. 1(*a*) and 1(*b*), wherein the arrays are divided into pixel blocks (Bi) and including masked areas (MA) of no interest.
Figure 4B:
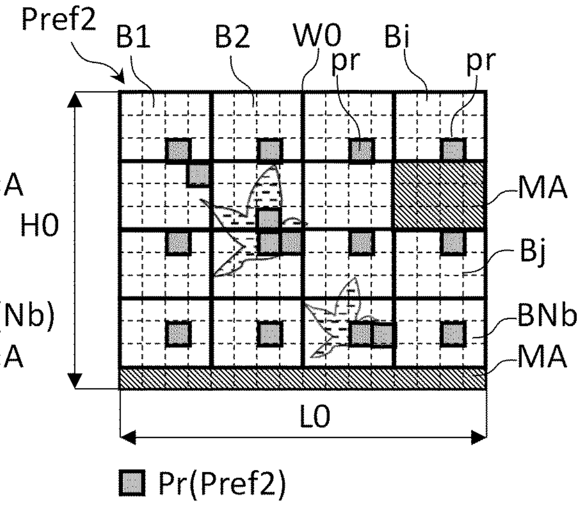

In regions where no event of relevance for the purposes of the image capturing device, such as a wall in the foreground, the main window (W0) can comprise one or more masked portions (MA) as shown in FIGS. 4(*a*) and 4(*b*). The masked portion (MA) comprise either, no reference pixels (pr, pri), or comprises reference pixels (pr, pri) but they are not taken into consideration by the processing unit for neither the triggering condition, nor the predefined number of motion pixels (pm).

When the number Nm of motion pixels (pm) satisfies a triggering condition, the processing unit is configured for passing from the movement detection mode to an image capture mode. For example, the triggering condition can be considered as being satisfied if the number Nm of motion pixels (pm) is greater than or equal to a predefined lower triggering number (Ntd) (i.e., if 0<Ntd≤Nm). Additionally or alternatively, the triggering condition can be considered as being satisfied if the number Nm of motion pixels (pm) is lower than or equal to a predefined upper triggering number (Ntu) (i.e., if 0<Ntd≤Nm). Combining the foregoing two conditions, the triggering conditions would be satisfied if 0<Ntd≤Nm≤Ntu. For example, the triggering conditions could be satisfied if the number (Nm) of motion pixels (pm) is comprised between 50% and 100%, preferably between 75% and 95%, or is preferably equal to 100% of the number Nr of reference pixels.

The predefined lower triggering number (Ntd) can be required, for example, to prevent the processing unit from interpreting as a movement a change in a very limited number of reference pixels. For example, it may not be desirable to consider a branch in a corner of the main window (W0) moving with the wind as satisfying the triggering conditions. The predefined lower triggering number (Ntd) can be expressed as an absolute value (Ntd) of a lower boundary of the number Nm of motion pixels, below which the triggering condition is not fulfilled (i.e., Ntd $\in \mathbb{N}$). Alternatively, the predefined lower triggering number (Ntd) of motion pixels can be defined in terms of a fraction (nmd %) of the number (Nr) of reference pixels (pr) (i.e., Ntd=nmd %×Nr) In the latter case, the predefined lower triggering number (Ntd) can be comprised between 50 and 100%, preferably between 70 and 95%, more preferably, between 75 and 80% of the number (Nr) of reference pixels (pr). Ntd=100% means that the triggering conditions are fulfilled only if all reference pixels are motion pixels (i.e., Nm=Nr).

The predefined upper triggering number (Ntu) can be required, for example, to prevent the processing unit from interpreting as a movement a sudden change of light (e.g., a light is switched on or off, or a dark cloud shades the sunlight) which would affect the signal of all reference pixels. As for the predefined lower triggering number (Ntd) discussed supra, the predefined upper triggering number (Ntu) can be expressed as an absolute value (Ntu) of an upper boundary of the number Nm of motion pixels, above which the triggering condition is not fulfilled (i.e., Ntu $\in \mathbb{N}$). Alternatively, the predefined upper triggering number (Ntu) of motion pixels can be defined in terms of a fraction (nmu %) of the number (Nr) of reference pixels (pr) (i.e., Ntu=nmu %×Nr). In the latter case, the predefined upper triggering number (Ntu) can be comprised between 75 and 100%, preferably between 85 and 98%, more preferably, between 90 and 95% of the number (Nr) of reference pixels (pr).

In a preferred embodiment illustrated in FIGS. 4(*a*) and 4(*b*), the image sensor is divided into Nb photosensor blocks. Each photosensor block is formed by Ni adjacent photosensors. The blocks pave the whole main window area, without overlapping, such that each photosensor of the nominal number (N0) of photosensors forming the array belongs to one and only one photosensor block. Each one of the Nb photosensor blocks independently comprises a number Nri of block reference photosensors defined as the reference photosensors belonging to the block. An input image (P0) is similarly divided into Nb pixel blocks (Bi) corresponding to the Nb photosensor blocks, wherein each of the pixel blocks (Bi) comprises Nri reference pixels (pr). If the value differences of a given reference pixel of a pixel block (Bi) exceeds the predefined threshold variation, the given reference pixel (pr) is identified as a motion pixel (pm), in the same manner as discussed supra. In the movement detection mode, each pixel block (Bi) can therefore contain a block number Nmi of motion pixels (pm). All pixel blocks (Bi) need not necessarily have the same size, and the geometry of the pixel blocks can tailor the actual topography of the scene enclosed in the frame defined by the main window (W0).

The advantage of dividing the main window (W0) into pixel blocks (Bi) is that it allows defining more targeted triggering conditions. For example, the triggering conditions can be satisfied when the block number Nmi of motion pixels (pm) of at least one pixel block (Bi) is greater than or equal to a predefined lower block triggering number (Ntdi) (i.e., if 0<Ntdi≤Nmi). Additionally or alternatively, the triggering conditions can be satisfied when the block number Nmi of motion pixels (pmi) is lower than or equal to a predefined upper block triggering number (Ntui) (i.e., if 0<Ntdi≤Nmi). Combining the foregoing two conditions, the triggering conditions would be satisfied if 0<Ntdi≤Nmi≤Ntui. As explained supra with respect to the predefined lower and upper triggering numbers (Ntd, Ntu), the predefined lower and upper triggering block numbers (Ntdi, Ntui) can be expressed as absolute values (Ntd, Ntu) of a lower and upper boundary of the number Nm of motion pixels in the block (i), below and above which the triggering condition is not fulfilled, respectively (i.e., Ntdi and Ntui $\in \mathbb{N}$). Alternatively, the predefined lower and upper triggering block numbers (Ntdi, Ntui) of motion pixels can be defined in terms of a fraction (nmdi %, nmui %) of the number (Nri) of block reference pixels (pri) (i.e., Ntd=nmdi %×Nr and Ntu=nmui %×Nr) The predefined lower and upper triggering block numbers (Ntdi, Ntui) can have same values in all blocks (Bi), or can vary from one block (Bi) to another.

In one embodiment, each pixel block contains a single reference pixel (pr). It the value difference of the reference pixel (pr) of a given pixel block (Bi) exceeds the predefined threshold variation, the triggering condition is satisfied for the given block. The pixel blocks (Bi) can, however, contain one or more than one reference pixels (pr) (i.e., Nri≥1) and the number of reference pixels can be the same or different in two different pixel blocks. If a pixel block (Bi) contains more than one reference pixel (pr), the conditions to satisfy the triggering condition could vary. For example, as soon as a block contains one motion pixel (pm) the triggering condition is satisfied for this block (cf. FIG. 5(*b*)). Alternatively, a pixel block (Bi) must contain at least a predefined lower block triggering number (Ntdi) of motion pixels to satisfy the triggering conditions. For example, the triggering condition could be satisfied for a given pixel block (Bi) only if all the reference pixels (pr) of the given block (Bi) are motion pixels (pm) (cf. FIG. 5(*c*)). It can be seen that dividing the main window (W0) in pixel blocks (Bi) gives an infinite variation of triggering conditions, which can be adapted to the specific topography and objective of the image capturing device. For example, a finer and denser network of blocks (Bi) and/or of reference pixels (pr) can be concentrated in regions of the main window (W0) where events are expected with more probability. In case the main window comprises masked areas (MA), these can form one or more pixel blocks (Bi).

When the number Nm of motion pixels (pm) satisfies the triggering condition, the processing unit is preferably configured for generating an interrupt signal indicative of a switching into image capturing mode and of a coming output image (P1).

Output Window (W1), Output Window Area (A1),

When the triggering condition is fulfilled indicative that a movement was detected within a region of the main window (W0), the processing unit switches from the movement detection mode to the image capturing mode. Preferably, the processing unit is configured for generating an interrupt signal indicative that a movement detected in a region of the main window and of a switching into the image capturing mode. Before capturing the output image (P1) to be transferred for further treatment, the processing unit of the integrated circuit is configured for optimising the output window area (A1) of the output window (W1) and the output number of pixels (N1) such as to maximise the output pixel density (D1=N1/A1) of the output image (P1), whilst satisfying the condition N1<N1*m*. This optimisation process is carried out within the integrated circuit, prior to capturing the output image (P1) and of course, prior to transferring it outside of the integrated circuit for further treatments. This solution leads to considerable energy saving and requires less processing resources as the weight of the output image (i.e., the output number (N1) of pixels is restricted to not more than the predefined maximum number (N1*m*) of pixels, i.e., N1 N1*m*).

The processing unit defines the output window (W1) of output window area (A1) wherein A1=n×A0 and 0<n<1, satisfying the condition that the output window (W1) encloses at least the predefined lowertriggering number (Ntd) of motion pixels (pm). Once the output window (W1) is defined, the processing unit defines the output pixel density D1=N1/A1<D0, satisfying the condition that the output number (N1) of pixels does not exceed the predefined maximum output number (N1*m*), i.e., N1=m×N0<N1*m*, with 0<m 5 n<1. The output area (A1) of the output image (W1) and the output number (N1) of pixels can be optimised in different ways. For example, they can be optimised by satisfying one or more of the following criteria.

The main window (W0) is generally rectangular and has a length (L0) and a height (H0) with A0=L0×H0 as illustrated in FIGS. 1(*a*)&1(*b*), 2(*a*), 3(*a*), 4(*a*)&4(*b*), and 5(*a*). The output window (W1) is also generally rectangular and has a length (L1) and a height (H1), with A1=L1×H1, such that L1=nL×L0 and H1=nH×H0, wherein nL and nH are each smaller than or equal to unity (i.e., nL≤1, nH≤1), as illustrated in FIGS. 2(*b*), 2(*c*), 5(*b*), and 5(*c*). The output window (W0) can be selected according to different criteria.

In one embodiment illustrated in FIG. 2(*b*), nL is independent of nH and could have different values (i.e., nH≠nL is possible). In an alternative embodiment illustrated in FIG. 2(*c*), an aspect ratio (L1/H1) of the output window (W1) is equal to a nominal aspect ratio (L0/H0), such that, L1/H1=L0/H0⇔nL=nH, and $n=nL^2=nH^2$. In a preferred embodiment, nH and nL both or each independently have a value selected among preselected values of 1, ½, ⅓, or ¼. Alternatively, the length (L1) and height (H1) of the output window (W1) can be selected among a predefined set of output image window lengths (L1) and heights (H1).

The output window (W1) must enclose at least a predefined fraction of thenumber (Nm) of motion pixels (pm). This allows focusing the output window (W1) in a region of the main window (W0) where events occurred with movement detected therein. For example, the processing unit can be configured to ensure that the output window (W1) encloses a number of motion pixels comprised between 50% and 100%, preferably between 75% and 95%, or is preferably equal to 100% of the number (Nm) of motion pixels (pm). In an embodiment, the processing unit can be configured to enclose in the output window (W1) only the motion pixels comprising at least one or two, or more direct neighbouring reference pixels (pr) which are also motion pixels (pm). This would avoid including portions of the main window (W0) where only minimal motion occurred, as indicated by the fact that a single (isolated) reference pixel (pr) varied to become a motion pixel (pm) in that portion of W0.

The output window (W1) can be limited to an output window area (A1) greater than or equal to a predefined minimum output window area (A1 min), such that 0<A1 min≤A1≤A0. This allows avoiding selecting an output window (W1) of too small dimensions to capture a wide enough frame to have a large enough general view of the scene (see for example, FIG. 2(*b*) which shows only a fraction of both large and small birds).

Figure 5A:
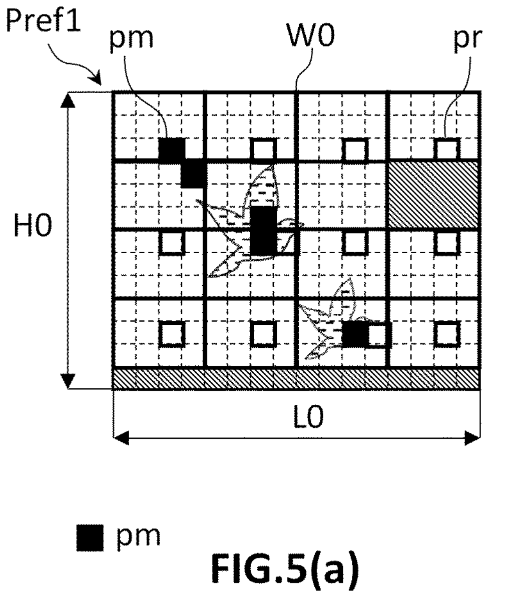
FIG. 5(*a*): shows an example of the motion pixels (Pm) in black squares, whose value differences between the first and second reference pixels of FIGS. 4(*a*) & 4(*b*) exceed a predefined threshold variation.
Figure 5B:
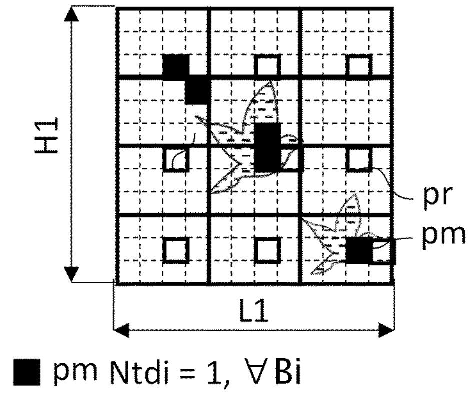
Figure 5C:
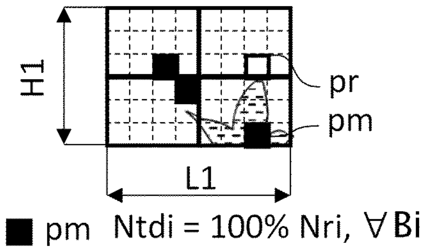

It the image sensor is divided into Nb photosensor blocks, the output window (W1) may enclose all the blocks (Bi) satisfying different criteria. For example, as shown in FIG. 5(*b*) it suffices that one reference pixel (pr) of a pixel block (Bi) be identified as a motion pixel (pm), for the whole pixel block (Bi) to be enclosed within the output image (W0), regardless of whether the pixel block (Bi) comprises other reference pixels (pr) which are not motion pixels (pm). Alternatively, to be enclosed within the output window (W0), a pixel block may require that all the reference pixels contained therein be identified as motion pixels (pm) as illustrated in FIG. 5(*c*). This of course can substantially reduce the output window area (A1) of the output window (W1). In between these two extremes, a pixel block (Bi) can be included within the output window (W0) as soon as at least a predefined fraction of the reference pixels (pr) be identified as motion pixels, such as at least 50% of the reference pixels (pr), preferably at least 67% or 75% of the reference pixels (pr).

As the output window (W1) size (A1, L1, H1) and location within the main window (W0) have been determined, the processing unit is configured for determining the output number of pixels (N1) for optimizing the resolution of the output image (P1) satisfying the condition of not exceeding the predefined maximum output number (N1*m*) of pixels. This process is described in continuation.

Output Number of Pixels (N1) and Output Pixel Density (D1)

Capturing an output image (P1) of given output image area (A1) with a reduced output number (N1≤N1*m*) of pixels has the advantage of facilitating the transfer of the output image thus captured for further treatments, but it also has the disadvantage of possibly reducing the resolution thereof, with a possibly lower output pixel density, D1=N1/A1. The processing unit of the integrated circuit is configured for maximising the output pixel density (D1) whilst maintaining the output number (N1) of pixels below or equal to the predefined maximum output number (N1*m*) of pixels.

For example, the processing unit could be configured for ensuring that the output pixel density (D1) is greater than or equal to a predefined minimum output pixel density (D1min), such that 0<D1min≤D1≤D0. This avoids capturing output images (P1) of too poor resolution for further treatments. If it is not possible to define A1 and N1, such that D1=A1/N1 D1 min, and at the same time that N1≤N1*m*, the processing unit can be configured for defining an alternative output image area (A1), smaller than the former one, using different criteria as defined supra. The processing unit then checks whether it is possible to define a value of N1, which fulfils both criteria on D1 D1 min and N1<N1*m*.

Ideally, it would be preferred in all cases to maximise the output pixel density (D1) to its maximum possible value of D1=D0, i.e., that all the photodetectors of the subarray defining the output window (W1) yield a value of a corresponding pixels. Since A1=n×A0 and N1=m×N0≤N1*m*, it follows that D1=D0 if m=n (i.e., D1=m N0/n A0=m/n D0). Whenever possible, i.e., if N1 N1*m*, the output number (N1) of pixels of the output image (P1) is selected as N1=n N0, wherein n is the proportionality factor between A1 and A0, so as to yield the maximum resolution with the highest possible value of the output pixel density, D1=D0, afforded by the image sensor (i.e., A1=n×A0 and N=n×N0 so that D1=D0). If, however, the output number (N1=n×N0) of pixels of the output image (P1) is larger than the predefined maximum output number (N1*m*) of pixels (i.e., if N1=n N0>N1*m*), then the number proportionality factor m must be reduced to less than the area proportionality factor n (i.e., m<n), until N1≤N1*m*. It follows that the resolution of the output image (P1) is also reduced, with an output pixel density (D1) lower than the nominal pixel density (D0) (i.e., D1=m/n D0, with m/n<1).

Figure 3A:
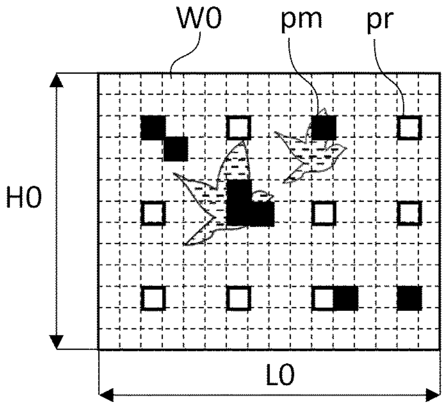
FIG. 3(*a*): shows a second example of the motion pixels (Pm) in black squares, whose value differences between the first and second reference pixels of FIGS. 1(*a*) & 1(*b*) exceed a predefined threshold variation.
Figure 3B:
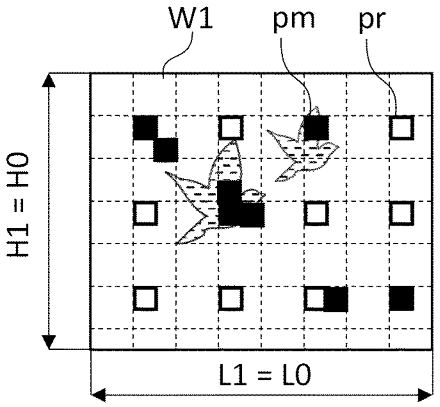

Reducing the output number (N1) of pixels, however, cannot be done arbitrarily. Two common ways of reducing the output number (N1) of pixels for an output image (W1) of given output image area (A1) include decimation and aggregation (or binning). In decimation, only a pixel in every block of 2×2, 4×4, etc. pixels is read. Information contained in all the unread pixels is therefore lost. To avoid losing information, pixels can be "connected" together in order to average their signal in a process called aggregation or binning. If the pixels are completely connected 2×2 in parallel, the resulting aggregation appears like pixels four times larger than the individual pixels (i.e., aggregation of k×k pixels of pixel area a0 yields an aggregate pixel of aggregate area $k^2$×a0). This is illustrated in FIGS. 3(*a*) and 3(*b*), the latter showing a 2×2 aggregation of the image of FIG. 3(*a*), reducing the number of pixels in the output window area (A1) by a factor 4. According to Pelgrom's law, the signal to noise ratio should increase by 20 $\log_{10}(\sqrt{k^2})$ for a k×k aggregation, yielding 20 $\log_{10}(\sqrt{4})$=6 dB in the case of a 2×2 aggregation.

The processing unit of the present invention can be programmed for reducing the output number (N1) of pixels by either aggregation or decimation. Aggregation is, however, preferred, as losing completely the information of the unread pixels is not ideal in many applications. The processing unit can be configured for maximizing the A1/A0 ratio and for maximizing the product D1×A1 as follows. The output window (W1) has an output area, A1=n A0, with n<1 (determined as explained supra as a function of the number of the number and position of motion pixels). The maximum output pixel density D1=D0, yielding an output number N1 of pixels, N1=D1×A1=D0×n A0=n NO. To fulfil the requirement of not exceeding the maximum number (N1*m*) of output pixels (i.e., N1 N1*m*), with maximum output pixel density, the output number of pixels must satisfy N1=n N0≤N1*m*. If this condition is satisfied, the output image (P1) can have an output area A1=n A0 with a maximized output pixel density of D1=D0. If, on the other hand, n N0>N1*m*, the output pixel density (D1) must be reduced, such that D1=m D0, with m<1. The output number N1 of pixels is then equal to N1=(n×m)×N0≤N1*m*. For a given value of n, the largest value (m_max) of m allowing the condition N1≤N1*m*, is defined as m_max=N1*m*/(n N0).

For technical reasons, however, the output pixel density (D1) cannot always be reduced by any arbitrary value of the factor m, without distorting the output image. For example, aggregation (or binning) can reduce the number of pixels per unit area (=density) by a factor N×N, with N ∈ ℕ. In this case, it is quite possible that the technically largest available value (mt) of m be smaller than the value of m_max as defined supra (i.e., m=mt<m_max). If the output pixel density (D1) is smaller than m_max D0, the processing unit can be configured for performing two alternative options.

First, the processing unit can decide to capture the output image (P1) with an output window (W0) of output area, A1=n A0, and a resolution defined by an output number (N1) of pixels, N1=mt N0≤N1*m*, with an output pixel density, D1=mt D0.

Alternatively, the processing unit can be configured for increasing the output image area (A1) until the output number (N1) of pixels becomes close or equal to (but not more than) N1*m*, with an output pixel density of D1=mt D0. This option has the advantage of maximizing the output image area (A1) for the technically maximum output pixel density (D1=mt D0) available.

For example, if the main window (W0) has a Video Graphics Array (VGA) resolution of 640 pixels length by 480 pixels height yielding N0=307,200 pixels, the predefined maximum output number (N1*m*) of pixels of the output image (P1) is set to N1*m*=76,800 pixels pixels (this would correspond to a Quarter VGA (QVGA) resolution of 320 pixels length by 240 pixels in an output window of main image area (A0)), and the output window (W1) has an output image area, A1=n A0, with n<1; by keeping the maximal output pixel density, D1=D0, the output number (N1) of pixels is N1=n×307,200 pixels.

If N1=n 307,200<76,800 pixels=N1*m*, then the output image (P1) can keep the maximal output pixel density, D1=D0. If, on the other hand, N1=n 307,200>76,800 pixels=N1*m*, then the output pixel density (D1) must be reduced to reduce the output number (N1) of pixels, such that D1=m D0 so that N1=(m×n) NO. The maximum value (m_max) of the factor m is defined as m_max=N1*m*/(n N0).

If for example, n=50%, then the maximum value (m_max) of the factor m is, m_max=N1 76,800/(0.5×307,200)=0.5, yielding a maximum output number (N1=N1*m*) of pixels, N1=(m_max×n) N0=% N0=76,800 pixels=N1*m*, with an output pixel density, D1=m_max D0=%½ D0.

Now, a 2×2 binning reduces the output number (N1) of pixels of an output image (P1) of given output image area (A1) by a factor 4 relative to the input number (N0) of pixels (i.e., 2×2 binning reduces by a factor 4 the output pixel density (D1=% D0) of an output image (P1)). This means that the technically largest available value (mt=%) of the factor m is substantially smaller than the maximum value (m_max=0.5) (i.e., mt=0.25<m_max=0.5) and the output number (N1) of pixels of the output image (P1) would be N1=(mt×n) N0=N0/8=38,400 pixels, for an output image area A1=% A0. Since N1*m*=N0/4, it is therefore be possible to increase the ouput image area (A1) by increasing the proportionality factor n, by n1=n×mt/m_max=2 n, with n1>n) until the output number (N1) of pixels is equal to N1*m*. In the present example, the output area (A1) first defined has a value, A1=n A0, with n=0.5. With the values considered in the present example, the processing unit can therefore be configured to maximize the product A1×D1, and to define the output image (P1) with an output pixel density, D1=mt D0=D0/4, and with an output area, A1=n1 A0=A0 (i.e., n1=2 n=1), with an output number (N1) of pixels equal to N1*m* (i.e., N1=N1*m*=76,800), defining a QVGA resolution.

In an alternative example, N1*m*=19,200 pixels. This would correspond to a Quarter quarter VGA (QQVGA) resolution of 160 pixels length by 120 pixels in an output window of main image area (A0)). If n=50%, then the maximum value (m_max) of the factor m is, m_max=19, 200/(0.5×307,200)=0.125 (=⅛), yielding a maximum output number (N1) of pixels, N1=(m_max×n) N0=N0/8=19,200 pixels=N1*m*, with an output pixel density, D1=m_max D0=D0/8. As seen above, a 2×2 binning yields a value of m=%>⅛=m_max. This means that a 4×4 binning could be envisaged, yielding a value of mt=1/16<⅛=m_max. Again, if desired, the output image area (A1) could be increased by a factor mt/m_max=2, while keeping the output number (N1) of pixels equal to or below N1*m* (i.e., N1<N1*m*).

Regardless of whether the actual value of the output pixel density (D1), if the resulting output number (N1) of pixels is smaller than N1*m* (i.e., N1<N1*m*), the processing unit can be configured to either keep A1=n A0 or, alternatively, it can be configured to increase the output image area (A1=n1 A0, with n1>n) until N1 is close or preferably equal to N1*m* (but never higher).

The processing unit has been described as determining first the output window area (A1), and then maximizing the output pixel density (D1=N1/A1), wherein the given output window area (A1) is maximized as a function of at least the number (Nm) and/or positions of motion pixels (pm). As mentioned supra, in many cases, for technical reasons, it will not be possible to fit exactly the outlet number (N1) of pixels to the predefined maximum output number of pixels (i.e., generally, N1=mt N0≤N1*m*, wherein mt is the technically largest available value of m). The output window area (A1) can therefore be increased by extending the boundaries of the outlet window (W1) to include as many pixels as required to yield N1=N1*m* or at least N1 tending towards N1*m* (i.e., N1→N1*m*). In other words, N1=m_max N0=N1*m*, if m_max=N1*m*/NO or at least N1=m_max N0→N1*m*, if m_max→N1*m*/NO. This further operation has the advantage of increasing the field of the output image without decreasing the resolution thereof and still fulfilling the condition on N1≤N1*m*. Considering the foregoing example, with N1*m*=100,000 pixels, and N1=76,200 pixels (=QVGA), the output image area (A1) could be increased by 24% by adding 23,800 pixels until N1=N1*m*=100,000 pixels. The additional pixels can be added by adding successive lines of pixels of length (L1), or successive columns of pixels of height (H1), or both, thus homothetically increasing the output window area (A1) of the output window (W1).

Processing Unit —Optimizing A1, D1 Such that N1≤N1*m*

Figure 7:
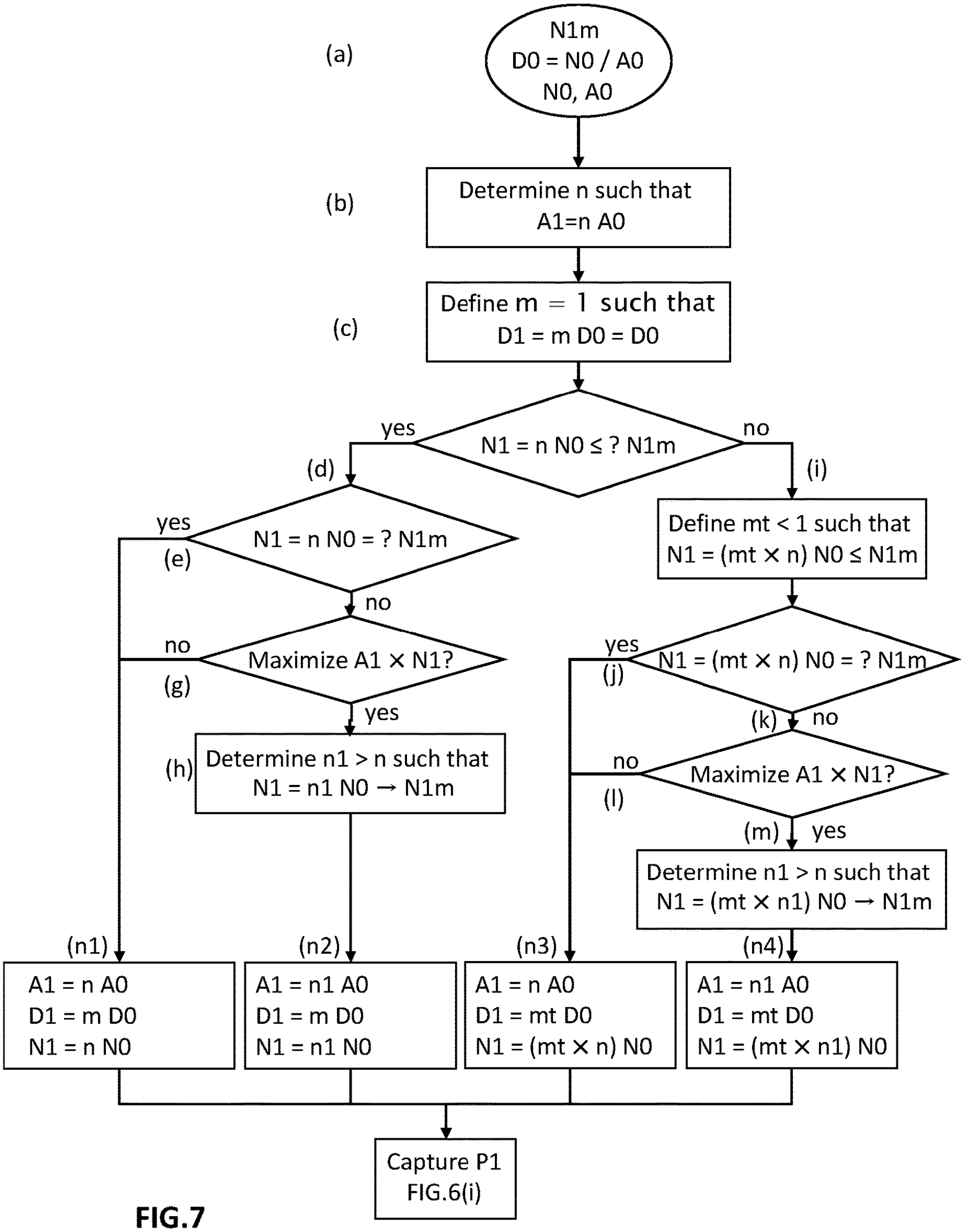
FIG. 7: shows a flowchart of how the processing unit of the integrated circuit of the present invention is configured for optimizing the product A0×D0.

FIG. 7 illustrates an embodiment of how the processing unit can be configured to optimize A1 and D1 such that N1<N1*m*, as exemplified in the previous section. The maximum output number (N1*m*) of pixels is defined. The array of photodetectors imposes the values of the main image area (A0) and of the nominal number (N0) of pixels, yielding the nominal pixel density, D0=N0/A0 (cf. FIG. 7(*a*)). As shown in FIG. 7(*b*), a first value of the output window area (A1) is defined, by defining a value of n, such that A1=n A0. This is carried out as explained supra depending on the number and positions of the motion pixels (pm). Since a maximum output pixel density is always preferred, to yield an output image (P1) of highest possible resolution, the factor m defining the output pixel density, D1=m D0, is set to 1, (i.e., m=1 and D1=D0) as shown in FIG. 7(*c*). The output number, N1=(m×n) N0, of pixels of an output image (P1) of output image area, A1=n A0 and output pixel density D1=m D0=D0 is equal to N1=m NO.

As shown in FIG. 7(*d*), in a first situation wherein N1=m N0≤N0, then the processing unit can assess whether N1 is equal to N1*m*. If N1=N1*m*, then the processing unit sets the parameters of the output image as indicated in FIGS. 7(*e*) & 7(*n*1), viz. A1=n A0, D1=m D0=D0 (i.e., m=1), and N1=n N0=N1*m*.

If on the other hand, N1<N1*m*, the processing unit can be satisfied and set the parameters of the output image as indicated in FIG. 7(*g*)&7(*ni*), viz. A1=n A0, D1=m D0=D0 (i.e., m=1), and N1=n N0≤N1*m*.

If on the other hand, the processing unit is configured for maximizing the product A1×D1 (cf. FIG. 7(*h*)). In this case, as shown in FIG. 7(*h*), the processing unit is configured for determining a value (n1>n) of the factor (n), such that the output number (N1) of pixels tends towards, preferably equals to N1*m* (i.e., N1=n1 N0→N1*m*, preferably N1=ni N0=N1*m*). The processing unit can then set the parameters of the output image as illustrated in FIG. 7(*n*2), viz, A1=n1 A0, D1=m D0=D0 (i.e., m=1), and N1=n1 N0→N1*m*, preferably, N1=n1 N0=N1*m*.

In a second situation, identified in FIG. 7(*i*), N1=n N0>N1*m*, yielding an output image (P0) which is too heavy to export. The output number (N1) of pixels must be reduced. Since the output image area cannot be reduced, since it has been determined such as to include a number of motion pixels according to different rules discussed supra, the sole option to reduce the output number (N1) of pixels is to reduce the output pixel density, D1=m D0<D0 (i.e., m<1). As discussed supra, for technical reasons, the output pixel density may not be freely varied. This is the case if binning is applied, which aggregates a same number of pixels along a line as along a column of the array. The processing unit can therefore be configured for determining the technically largest available value (mt) of m yielding an output number (N1) of pixels smaller than or equal to N1*m* (cf. FIG. 7(*i*)). If N1=(mt×n) N0=N1*m*, then the processing unit sets the parameters of the output image as indicated in FIG. 7(*j*)&7(*n*3), viz. A1=n A0, D1=mt D0, and N1=(mt×n) N0=N1*m*.

Now, as illustrated in the example supra, the output number, N1=(mt×n) N0≤N1*m*, may be lower than N1*m*. In this case, the processing unit can be satisfied and set the parameters of the output image as indicated in FIG. 7(I)&7 (*n*3), viz. A1=n A0, D1=mt D0, and N1=(mt×n) N0≤N1*m*.

If on the other hand, the processing unit is configured for maximizing the product A1×D1 (cf. FIG. 7(*m*)). In this case, as shown in FIG. 7(*m*), the processing unit is configured for determining a value (n1>n) of the factor (n), such that the output number (N1) of pixels tends towards, preferably equals to N1*m* (i.e., N1=n1 N0→N1*m*, preferably N1=n1 N0=N1*m*). The processing unit can then set the parameters of the output image as illustrated in FIG. 7(*n*4), viz, A1=n1 A0, D1=mt D0, and N1=(mt×n1) N0→N1*m*, preferably, N1=(mt×n1) N0=N1*m*.

Once the parameters of the output image (P1) are defined as explained supra, including the definition of the output window (W1), the output window area (A1), and output pixel density (D1) satisfying the condition that the output number (N1) of pixels must not exceed the predefined maximum output number (N1*m*) of pixels (i.e., N1≤N1*m*), the processing unit of the integrated circuit is configured for controlling the array of photosensors to capture the output image (P1). Once captured, the output image can be exported for further treatment. Since the weight of the output image (P1) is limited to not more than N1*m* pixels, the power consumed for the transfer are minimized by avoiding a transfer of a large and dense frame, reducing also the processing resources required for the transfer of the output image.

The gist of the present invention is to move the processing to select the area of interest to the integrated circuit prior to exporting the output image (P1), rather than capturing a full-size output image (P1) and re-framing it in a separate image treatment unit after transfer of the output image thereto. This means that the camera can keep a large range of vision and will only transmit to the processing unit the relevant subset of the picture, without losing in resolution.

Image Capture and Treatment Device

The present invention also concerns an image capture and treatment device comprising the integrated circuit as defined supra, a lens in optical communication with the array of N0 photosensors of the image sensor of the integrated circuit, and an image treatment unit in communication with the integrated circuit and configured for receiving and preferably saving the output images (P1) from the integrated circuit.

The image treatment unit is preferably configured for receiving an interrupt signal generated by the processing unit of the integrated circuit, which is indicative of a coming output image (P1). Upon receiving the interrupt signal, the image treatment unit can switch from a sleep mode of the image treatment unit to a wake-up mode of the image treatment unit.

FIG. 6 shows a flowchart explaining the various operations the processing unit of the integrated circuit of the present invention is configured for carrying out. With an integrated circuit comprising an array of photosensors for capturing input images (P0) framed in a main window (W0) of main window area (A0), with a nominal pixel density (D0), the processing unit stores the value of the predefined maximum output number $N1m < N0$ of pixels not to be exceeded by an output number (N1) of pixels defining the output image (P1) to be transferred out of the integrated circuit (i.e., $N1 \leq N1m < N0$), (cf. FIG. 6, boxes (a)&(b)). The subarray of reference pixels (pr) must be defined as shown in FIG. 6, box (c)). Of course, this operation is carried out the first time the camera is installed. It can, however, preferably be modified at any time by the user. To detect a movement in a region comprised within the frame of the main window (W0), the processing unit is configured for capturing a sequence of successive reference images (Pref1, Pref2) at different times/(cf. FIG. 6, boxes (d)&(e)). The reference pixels (pr) satisfying the criteria for being considered as motion pixels (pm) are identified, and the processing unit checks whether the triggering conditions are fulfilled by the motion pixels (pm) to conclude that there has been a movement between a first and second reference images (Pref1, Pref2) (cf. FIG. 6, boxes (f)&(g)). If the triggering conditions are not fulfilled, the processing unit captures a next reference image (Pref3). In a first embodiment illustrated in the loop (g1), the processing unit repeats steps (f)&(g)), comparing the next reference image (Pref3) with the first reference image (Pref1) until the triggering conditions are satisfied, and a movement has been detected. In an alternative embodiment, illustrated with loop (g2), the next reference image (Pref3) is compared with the preceding reference image (Pref2) and the processing unit repeats steps (f)&(g) by replacing the first reference image (Pref1) by the second reference image (Pref2) for the sake of comparisons, and so on until the triggering conditions are satisfied, and a movement has been detected. The processing unit then passes in image capture mode, wherein the parameters of the output image (P1) to be captured are first optimized. before capturing the output image (cf. FIG. 6, box (h)). In particular, the output window (W1) and output image area (A1) are defined, focusing on the region of the main window (W0) where the movement occurred. The output pixel density (D1=N1/A1) of the output image (P1) is then maximized taking care to fulfil the condition $N1 < N1m$. Once the parameters of the output images are set, the processing unit is configured for capturing the output image (P1) with said parameters, and for transferring the output image (P1) out of the integrated circuit for further treatment or analysis (cf. FIG. 6, boxes (i)&(i)). The processing unit is then ready for passing in movement detection mode again, and capturing a new sequence of successive reference images (Pref1; Pref2) at different times and repeating the foregoing steps (cf. FIG. 6, loop between boxes (j) and (d)).

| REF# | FEATURE |
|---|---|
| A0 | Main window area |
| A1 | Output window area |
| A1min | Minimum output window area |
| Bi | Pixel block |
| D0 | Nominal pixel density = N0/A0 |
| D1 | Output pixel density = N1/A1 |
| D1min | Predefined minimum output pixel density |
| H0 | Main window height |
| H1 | Output window height |
| L0 | Main window length |
| L1 | Output window length |
| m | Factor, m = N1/N0, with $0 < m \leq n < 1$ |
| MA | Masked portion of the main window (W0) |
| m_max | Maximum value of factor m, m_max = N1m/N0 |
| mt | Technically largest available value of m ($mt \leq m\_max$) |
| n | n = A1/A0, with $0 < m \leq n < 1$ |
| N0 | Nominal number of pixels in the main window area (A0) |
| n1 | Output image area factor such that N1 = (m × n1) N0 → N1m |
| N1 | Output number of pixels |
| N1m | Predefined maximum output number of pixels |
| Nb | Number of pixel blocks (Bi) and of photosensor blocks |
| nH | nH = H1/H0 |
| nL | nL = L1/L0 |
| Nm | Number of motion pixels |
| Nr | Number of reference photosensors and of reference pixels |
| nmd % | Lower fraction defining Ntd = nmd % × Nr |
| nmu % | Uper fraction defining Ntu = nmu % × Nr |
| Nri | Block reference photosensor |
| Ntd | Predefined lower triggering number |
| Ntdi | Predefined lower triggering number in a pixel block Bi |
| Ntu | Predefined ipper triggering number |
| Ntui | Predefined ipper triggering number |
| P0 | Input image |
| P1 | Output image |
| pm | Motion pixel |
| pr | Reference pixel |
| pri | Reference pixel of a pixel block Bi |
| Prefj | Reference images (taken successively) |
| W0 | Main window |
| W1 | Output window |

The invention claimed is:

1. An integrated circuit for automatically optimizing a ratio (A1/A0) of an output image area (A1) to a main window area (A0) the integrated circuit comprising:

an image sensor comprising an array formed by a nominal number (N0) of photosensors configured for capturing values of NO pixels defining corresponding input images (P0) each input image being comprised in a main window (W0) having the main window area (A0), the input images having a nominal pixel density D0=N0/A0, a processing unit configured for carrying out the following actions:

controlling a predefined subarray of Nr reference photosensors, with Nr≤N0, to capture a sequence of successive reference images (Prefj) at different times, each reference image being defined by Nr corresponding reference pixels (pr), as a given reference image is captured, determining a value difference between corresponding pixels from the given reference image and a reference image preceding the given reference image in the sequence and selecting a number (Nm) of motion pixels (pm) whose value differences exceed a predefined threshold variation, characterized in that, the processing unit is configured for saving the predefined maximum output number Nlm<NO of pixels not to be exceeded by an output number (N1) of pixels defining the output image (P1) to be transferred out of the integrated circuit (i.e., N1≤N1*m*<N0), and in that, when the number Nm of motion pixels (pm) satisfies a triggering condition, the processing unit is configured for, defining:

an output window (W1) of an output window area (A1) wherein A1=n×A0 and 0<n≤1, which encloses at least a predefined lower triggering number (Ntu) of motion pixels (pm), and an output pixel density D1=N1/A1≤D0, wherein an output number of pixels N1=m×N0≤N1*m* with m<1 and 0<m≤n≤1, controlling the array of NO photosensors to capture the output image (P1) defined by the output window (W1) having the output window area (A1) and output pixel density (D1), transferring the output image (P1) comprising N1 pixels out of the integrated circuit.

2. The integrated circuit according to claim 1, wherein W1 and N1 satisfy one or more of the following criteria, the main window (W0) has a length (L0) and a height (H0) and A0=L0×H0, and the output window (W1) has a length (L1) and a height (H1) and A1=L1×H1, such that L1=nL×L0 and H1=nH×H0, wherein nL and nH are each smaller than or equal to unity the predefined lower triggering number (Ntu) of motion pixels (pm) is comprised between 50% and 100 of the number Nr of reference pixels (pr), output window (W1) is rectangular, and the predefined number of motion pixels (pm) is inscribed in the output window (W1), the length (L1) and height (H1) of the output window (W1) are selected among a predefined set of output image window lengths and heights, the output window area (A1) is greater than or equal to a predefined minimum output window area (A1min), such that 0<A1min≤A1≤A0, the output pixel density (D1) is greater than or equal to a predefined minimum output pixel density (D1 min), such that 0<D1 min≤D1≤DO.

3. The integrated circuit according to claim 1, wherein the processing unit defining the output window (W1) and the output pixel density (D1) of the output image (P1) defined by the output number (N1≤N1*m*) of pixels is configured for:

for a given output pixel density (D1=m D0), maximizing the output window area (A1=n1 A0).

4. The integrated circuit according to claim 1, wherein the processing unit is configured for allowing a modification of the number (Nr) and positions of the reference photosensors.

5. The integrated circuit according to claim 1, wherein the reference photosensors, are evenly distributed over the main window area (A0) or are located at critical areas of the window (W0) where motions are expected.

6. The integrated circuit according to claim 1, wherein the processing unit is configured for allowing a modification of the maximum output number (N1*m*) of pixels.

7. The integrated circuit according to claim 1, wherein when the number Nm of motion pixels (pm) satisfies the triggering condition, the processing unit is configured for generating an interrupt signal indicative of a coming output image (P1).

8. The integrated circuit according to claim 1, wherein the input image has a Video Graphics Array (VGA) resolution of 640 pixels length by 480 pixels height yielding N0=307,200 pixels, wherein the predefined maximum output number (N1*m*) is up to 76,800 pixels and wherein the output image (P1) has, a Quarter VGA (QVGA) resolution of 320 pixels length by 240 pixels height yielding N1=76,800 pixels or a Quarter Quarter VGA (QQVGA) resolution of 160 pixels width by 120 pixels height yielding N1=19,200 pixels.

9. The integrated circuit according to claim 1, wherein the triggering condition is satisfied if the number Nm of motion pixels (pm) is greater than or equal to a predefined lower triggering number (Ntd) (i.e., if 0<Ntd≤ Nm).

10. The integrated circuit according to claim 1, wherein:

the image sensor is divided into Nb photosensor blocks, each formed by Ni adjacent photosensors and such that each photosensor of the nominal number (N0) of photosensors forming the array belongs to a single photosensor block, the Nb photosensor blocks each independently comprising a number Nri of block reference photosensors defined as the reference photosensors belonging to the block, each of the input images (P0) comprises Nb pixel blocks (Bi) corresponding to the Nb photosensor blocks, wherein each of the pixel blocks (Bi) comprises Nri reference pixels (pri) and a block number Nmi of motion pixels (pmi).

11. The integrated circuit according to claim 10, wherein the triggering condition is satisfied when the block number Nmi of motion pixels (pmi) of at least one pixel block (Bi) is greater than or equal to a predefined lower block triggering number (Ntdi).

12. The integrated circuit according to claim 11, wherein the output image (P1) comprises at least all pixel blocks (Bi) satisfying the triggering condition.

13. The integrated circuit according to claim 1, wherein the main window (W0) comprises one or more masked portions (MA), wherein each masked portions (MA) comprising either, no reference pixels (pr, pri), or comprises reference pixels (pr, pri) but they are not taken into consideration for neither the triggering condition, nor the predefined number of motion pixels (pm).

14. An image capture and treatment device, comprising, the integrated circuit according to claim 1, a lens in optical communication with the array of NO photosensors of the image sensor of the integrated circuit, an image treatment unit in communication with the integrated circuit and configured for receiving the output images (P1) from the integrated circuit.

15. The image capture and treatment device according to claim 14, wherein the image treatment unit is configured for receiving an interrupt signal generated by the processing unit of the integrated circuit, which is indicative of a coming output image (P1) and for switching from a sleep mode of the image treatment unit to a wake-up mode of the image treatment unit upon receiving the interrupt signal.

16. The integrated circuit according to claim 1, further comprising maximizing a product D1×A1 of an output pixel density (D1) multiplied by the output image area (A1) of a motion detection area defining an output image (P1) composed of a predefined maximum number of pixels (N1*m*).

17. The integrated circuit according to claim 2, wherein nL and nH are each independently equal to 1, ½, ⅓, or ¼, and wherein the aspect ratio (L1/H1) of the output window (W1) is equal to a nominal aspect ratio (L0/H0), (i.e., L1/H1=L0/H0 and $n=nL^2=nH^2$).

18. The integrated circuit according to claim 2, wherein the predefined lower triggering number (Ntu) of motion pixels (pm) is between 75% and 95 of the number Nr of reference pixels (pr).

19. The integrated circuit according to claim 3, wherein the output number (N1=(m×n1)N0) of pixels is equal to the maximum output number (N1*m*) of pixels (i.e., N1=(m×n1) N0×N1*m*), and/or for a given output window area (A1=nA0), maximizing the output pixel density (D1=mt D0), the output number (N1=(mt×n)N0) of pixels is equal to the maximum output number (N1*m*) of pixels (i.e., N1=(mt×n)NO×N1*m*).

20. The image capture and treatment device according to claim 14, further comprising the image treatment unit in communication with the integrated circuit being configured for saving the output images (P1) from the integrated circuit.

* * * * *